Dec. 22, 1942.   D. W. FENTRESS   2,306,018
APPARATUS FOR MAKING FLEXIBLE TUBING
Filed Oct. 23, 1939   3 Sheets-Sheet 1
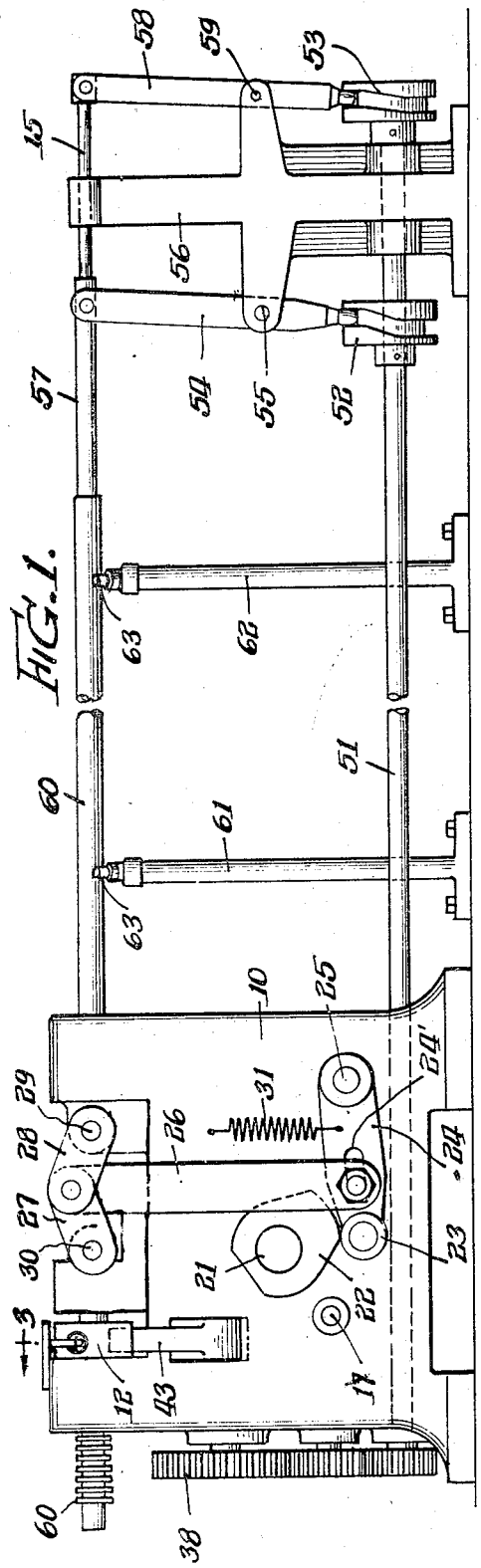
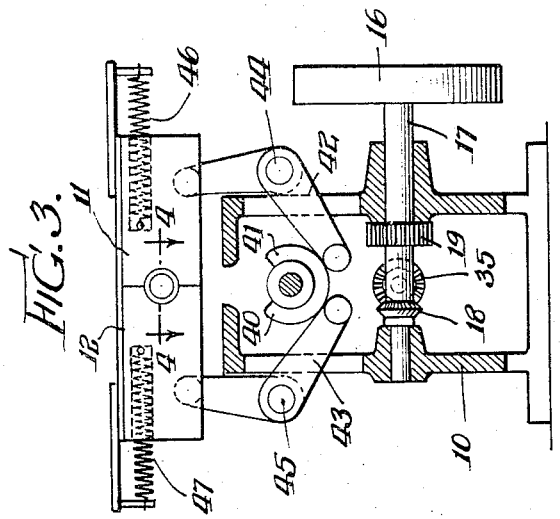
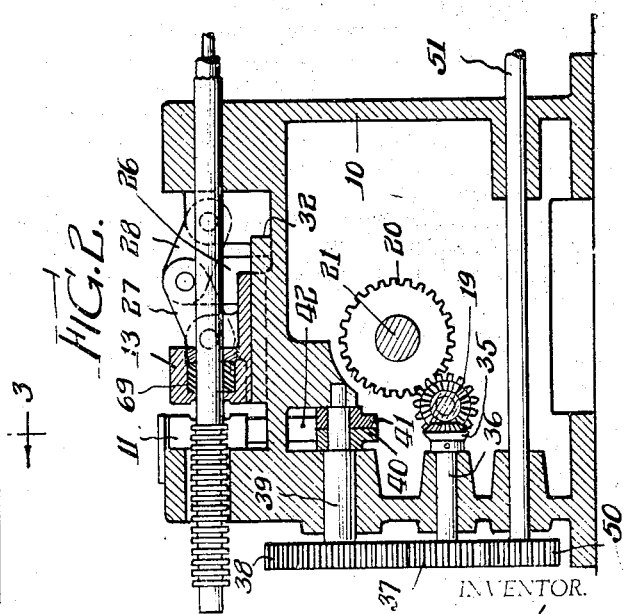
INVENTOR.
David Wendell Fentress
BY: Cox & Moore
ATTORNEYS.

Dec. 22, 1942. D. W. FENTRESS 2,306,018
APPARATUS FOR MAKING FLEXIBLE TUBING
Filed Oct. 23, 1939 3 Sheets-Sheet 2
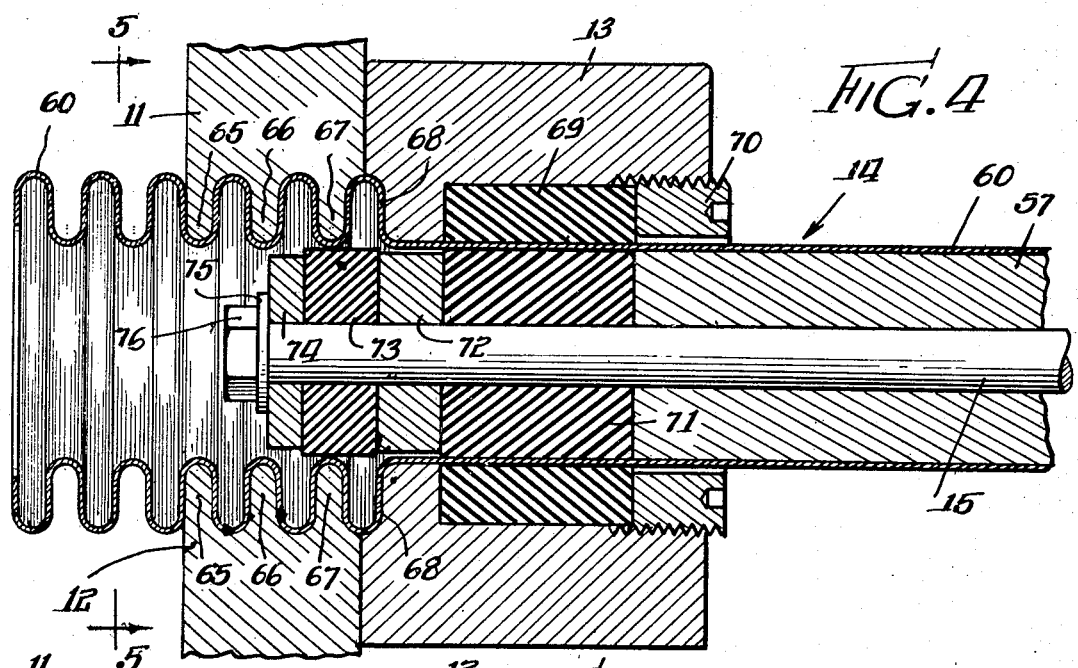
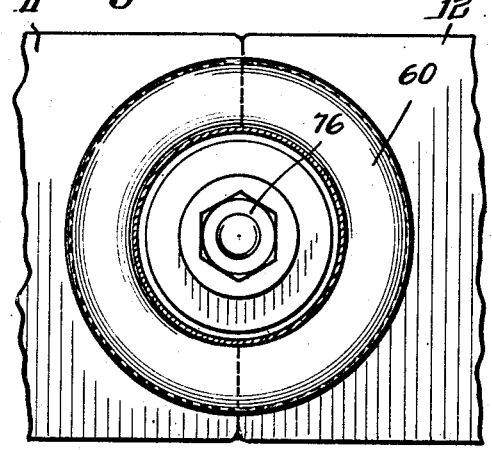
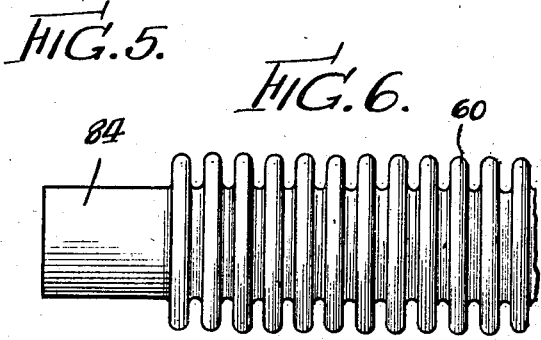
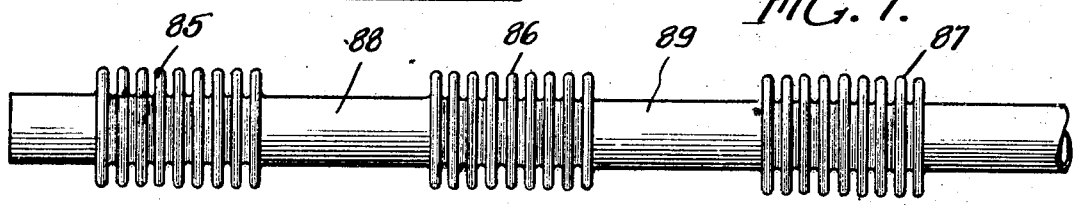
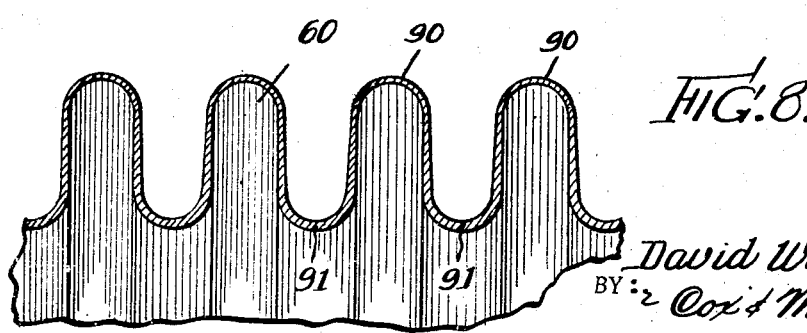
INVENTOR.
David Wendell Fentress
BY Cox & Moore
ATTORNEYS.

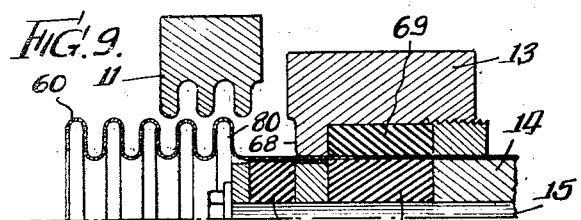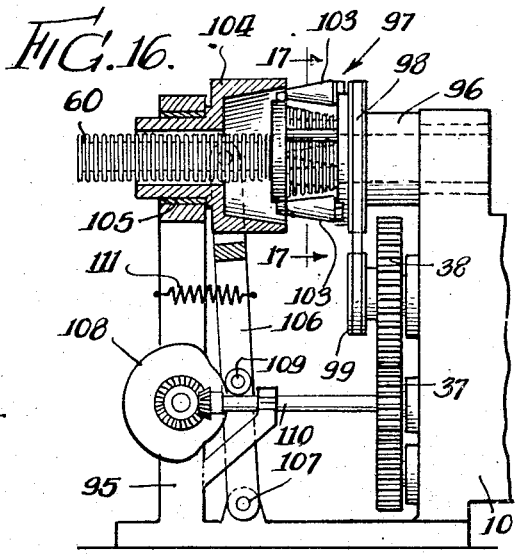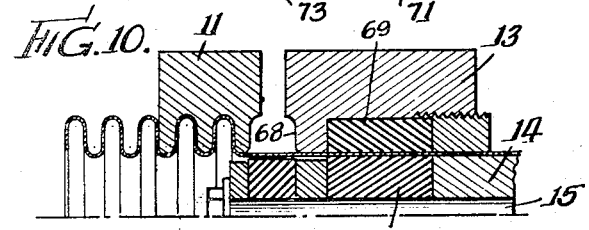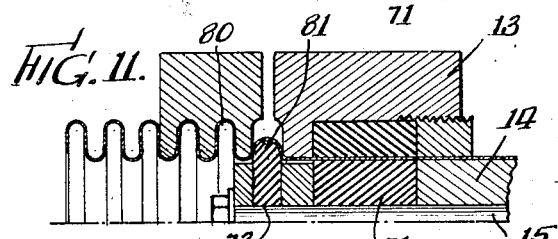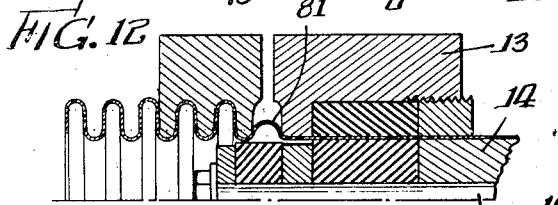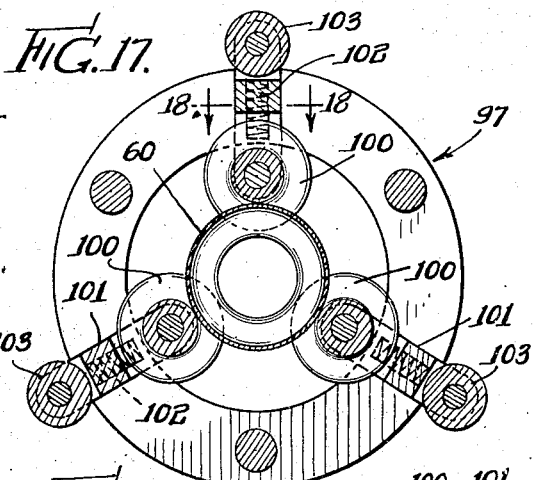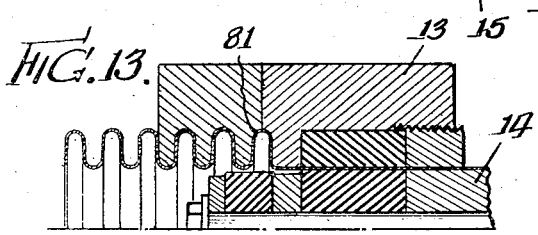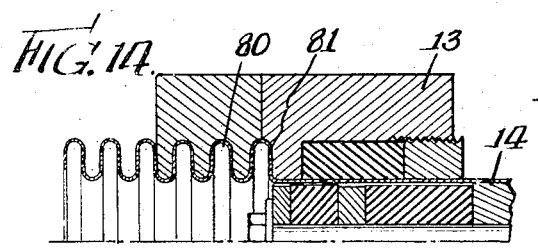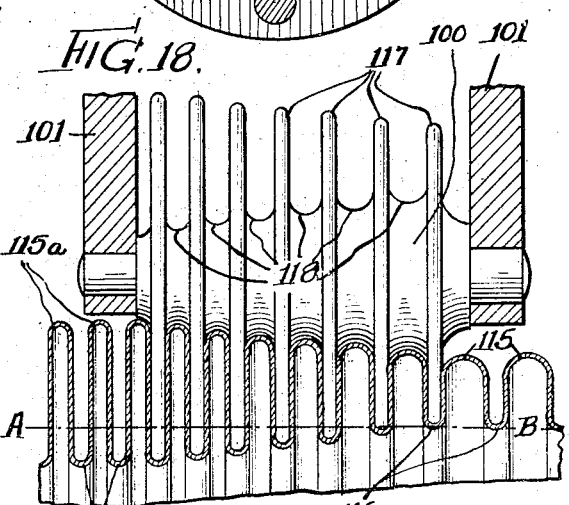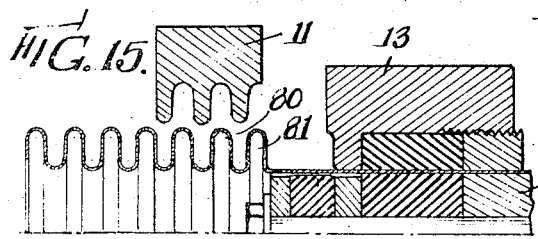

Patented Dec. 22, 1942

2,306,018

UNITED STATES PATENT OFFICE 2,306,018

APPARATUS FOR MAKING FLEXIBLE TUBING

David Wendell Fentress, Hubbard Woods, Ill., assignor to Chicago Metal Hose Corporation, Maywood, Ill., a corporation of Illinois Application October 23, 1939, Serial No. 300,775

13 Claims. (Cl. 153—73)

This invention relates to apparatus for making flexible metal tubing, particularly tubing of the seamless, annular, corrugated type.

It is an object of the invention to provide improved means for making flexible metal tubing, particularly of the seamless, annular, corrugated type. More particularly, it is an object to provide readily operable apparatus for making tubing of the type stated from very thin-walled metal tubing and in any desired lengths, either short or long.

A further object of the invention is to provide readily operable means for making thin-walled tubing with improved coupling attachment surfaces at the ends thereof, and provided with continuous corrugations or alternately spaced corrugated and non-corrugated sections as may be required.

Still further and more specific objects are to provide tube-making means which are more rapidly operable, which are automatic in operation, and wherein the tube corrugations may be formed at a single operating station by a substantially single operation and without undue stress to the tube wall structure.

Another object of the invention is to provide tube-making means wherein the trough portions of the tubing corrugations which are subjected to the maximum stress in the use of the tubing are worked or stressed a minimum amount during the corrugation processing.

Various other objects, advantages and features of the invention will appear from the following specification when taken in connection with the accompanying drawings wherein certain preferred embodiments of the invention are set forth for purposes of illustration.

In the drawings, wherein like reference numerals refer to like parts throughout:

Fig. 1 is a general assembly view, in side elevation, of a tube corrugating apparatus or machine constructed in accordance with the principles of the invention.

Fig. 2 is a partial sectional view of the apparatus shown in Fig. 1, more particularly illustrating the machine head for effecting the corrugating operation.

Fig. 3 is a transverse sectional view through the machine head, on the line 3—3 of Fig. 1.

Fig. 4 is a detail view on an enlarged scale of the corrugating head, at the corrugating station, the view being taken along the line 4—4 of Fig. 3.

Fig. 5 is a sectional view of the mechanism illustrated in Fig. 4, on the line 5—5 thereof.

Figs. 6 and 7 are detail views illustrating tubing pieces as may be made on the machine shown in Fig. 1, in accordance with the principles of the invention.

Fig. 8 is a detail view, on an exaggerated scale, illustrating the character of the corrugated tube wall.

Figs. 9 to 15 inclusive are detail views generally similar to Fig. 4, but illustrating the successive steps in the formation of the tube corrugation.

Fig. 16 illustrates an additional corrugation-shaping mechanism which may be used with the machine shown in Fig. 1, if desired.

Fig. 17 is a sectional view of the mechanism shown in Fig. 16, on an enlarged scale and on the line 17—17 of Fig. 16, and Fig. 18 is a detail view on a further enlarged scale of one of the corrugating rollers, and taken on the line 18—18 of Fig. 17.

Referring more particularly to the drawings, and first to Figs. 1 to 5 thereof, the machine illustrated comprises a main head frame 10 in which the mechanism for corrugating the tubing is incorporated. This corrugating mechanism, best shown in Figs. 2, 3 and 4, comprises in general a pair of separable gripping or holding jaws 11 and 12, an outer reciprocable corrugation-forming member or sleeve 13, an inner reciprocable-corrugating member generally indicated by the reference numeral 14, and a control shaft 15 reciprocably mounted within the corrugating member 14.

The several parts of the corrugating mechanism are all driven from a common power source, and in relative timed relation. More specifically, the head frame 10 is provided with a main prime mover, indicated at Fig. 3 as a pulley wheel 16. This pulley wheel is secured to and drives a cross shaft 17 toward the end of which is secured a beveled gear 18, and to the intermediate portion of which is secured a spur gear 19. The gear 19 meshes with and drives a larger gear 20, Fig. 2, fixed to a shaft 21. Each end of shaft 21 has fixed to it a cam member 22 adapted to operate a roller 23 secured to the end of an arm 24 pivoted to a pivot shaft as indicated at 25 in Fig. 1. The arm 24 actuates a link 26, the upper end of which is pivotally connected to a pair of toggle links 27 and 28, the outer end of the link 28 being pivotally connected to the head frame 10 as indicated at 29, and the outer end of the link 27 being pivotally connected to the corrugation-forming member 13 by a suitable pivotal connection as indicated at 30. The arm 24 is slotted longitudinally as indicated at 24, Fig. 1, to provide an adjustable connection between the arm and link 26. By this means the degree of movement imparted to the link as the arm is moved may be varied. The pivotal connection between the arm and link may be held in adjusted position by any suitable clamping nut. A tension spring 31 normally urges the link 26 upwardly and the arm 24 clockwise to maintain the roller 23 in engagement with its actuating cam 22. As will be understood by reference to Figs. 1 and 2, duplicate cam and link operating mechanisms are provided on each side of the head frame, whereby to impart a balanced thrust to the corrugating member assembly. By means of the mechanism described, as the shaft 21 is rotated reciprocatory motion is imparted to the corrugating member 13, the corrugating member and its associated assembly parts being slidably reciprocable along the ways 32. The contour of the cams 22 may be suitably shaped to impart the desired characteristic of motion to the corrugating member.

The bevel gear 18 drives a bevel gear 35 secured to a shaft 36, Fig. 2, the outer end of which carries a gear 37 meshing with a gear 38 secured to a shaft 39. The inner end of the shaft 39 carries a pair of cams 40 and 41, Fig. 3, adapted to actuate a pair of bell crank levers 42 and 43 pivotally mounted upon the head frame 10 as indicated at 44 and 45. The upper ends of the bell crank levers are pivotally connected to the gripping jaws 11 and 12 respectively. Tension springs 46 and 47 tend to move the jaws into separated position, thereby maintaining the lower ends of the bell crank levers in engagement with the actuating cams. By means of the mechanism described, as the actuating cams are rotated the bell cranks are operated to open and close the holding jaws 11 and 12 in timed relation to the movements of the other parts of the corrugating mechanism. The contour of the cams 40 and 41 is suitably shaped to impart the proper characteristic and timing of movement.

Gear 37 also meshes with a gear 50 secured to the end of a long shaft 51 on the outer end of which two cam track wheels 52 and 53 are mounted. The cam 52 operates a lever 54 pivoted as indicated at 55 upon a laterally projecting portion of a foot frame 56. The upper end of the lever 54 is pivotally connected to an elongated sleeve member 57 forming a part or extension of the inner corrugating assembly 14, as may be best understood by reference to Fig. 4. As the cam 52 is rotated, the cam track therein causes the pivotal operation of lever 54, thereby imparting reciprocatory motion to the sleeve 57. The cam track will be suitably formed to impart the proper timing and movement to the sleeve.

Similarly the cam 53 is adapted to operate a lever 58 pivoted as indicated at 59 to the foot frame, and pivotally connected at its upper end to the control shaft 15. By means of the cam 53 the control shaft is reciprocated in the proper timed movements, the contour of the cam track being suitably formed to impart the desired characteristic of motion.

The tube to be corrugated, indicated by the reference numeral 60, loosely embraces the sleeve 57, the sleeve to this end being of considerable length, for example forty feet or more, to enable the corrugation of long lengths of tubing. Suitable supports such as indicated at 61 and 62, Fig. 1, may be provided for supporting the sleeve and the tubing, these supports being provided with anti-friction devices such as rollers 63 at the upper ends thereof to facilitate the ready longitudinal motion of the tubing and sleeve.

The construction of the holding jaws 11 and 12 and of the outer and inner corrugating members 13 and 14 is best illustrated in Figs. 4 and 5. As will be seen, the separable holding jaws 11 and 12 are provided at their point of juncture with a series of annularly formed ribs or flanges 65, 66 and 67 shaped to conform to the contour of the completed tubing convolutions. The contour of the rib 67 adjacent to the outer corrugating member 13 forms one side of the tube corrugating station at which the corrugation is actually shaped or formed, as will be later described.

The outer reciprocable corrugating member 13 is provided with an annular surface 68 on the end face thereof shaped to conform to the tubing convolution, and forming the other side of the tube corrugating station. The corrugating member 13 also carries a concentrically disposed rubber sleeve 69, the rubber sleeve being held in place by means of an annular threaded locking member 70. The member 13 and the sleeve 69 are just enough larger than the tube 60 so as to permit the free sliding movement of these parts relative to the tube.

The inner corrugating member 14 comprises the metal sleeve 57, a rubber sleeve 71, a metal washer or sleeve 72, a rubber washer or sleeve 73 and a second metal washer 74 all mounted and held in place upon the control shaft 15 by means of a washer 75 and a nut 76 threaded to the end of the control shaft. The several parts of the inner corrugating assembly are likewise just sufficiently smaller than the tube 60 so as to normally allow free reciprocation of the parts within the tube. The parts forming the inner corrugating assembly 14 are also loosely mounted upon the control shaft so as to permit relative longitudinal movement between the control shaft and the parts mounted thereon. The rubber sleeves 69 and 71 constitute gripping devices for the tubing during the operation of the apparatus, as will now be described, and the rubber washer or sleeve 73 constitutes a forming member for effecting the partial formation of the tube corrugation. Preferably the rubber of member 73 is harder than that of members 69 and 71.

In operation, and referring particularly to the successive step illustrative views, Figs. 9 to 15 inclusive, the holding jaws 11 and 12, the outer and inner corrugating members 13 and 14, and the control shaft 15 are all operated in predetermined timed relation to effect the corrugation of the tubing at the corrugating station. The tube 60 to be corrugated is first slipped onto the inner corrugating member 14, the size of the members 13 and 14 being normally such as to permit the ready placement of the tube in position, as previously described. The prime mover 16 is then started to effect the corrugating operation. In Fig. 9 the gripping jaws, only jaw 11 being illustrated, are open and the corrugating members 13 and 14 are in retracted position. The tubing is in position to have a new corrugation formed therein, the previously formed corrugation 80 having been moved away from the corrugating station. The holding jaws are first moved to closed position as illustrated in Fig. 10, whereby to grip the tubing and hold it from longitudinal movement. The corrugating members 13 and 14 are then moved forwardly together from the position shown in Figs. 9 and 10 to the position illustrated in Fig. 11. During this movement the control shaft 15 is held substantially stationary so that as corrugating member 14 is moved, the rubber sleeve 71 is axially compressed and caused to expand, thereby firmly gripping the tubing between the rubber sleeves 71 and 69. Accordingly as the corrugating members 13 and 14 are moved forwardly together, the tubing will be positively moved therewith. Simultaneously, the tube-forming rubber sleeve or washer 73 is axially compressed and radially expanded as indicated in Fig. 11, causing the initial or half formation of the new tubing convolution 81. Whereas the feeding sleeve 71 is confined radially and hence limited in its degree of expansion, the forming sleeve 73 is free to expand into the space between the holding jaws and the corrugating member 13. The expansion of the forming sleeve insures the proper initial or partial formation of the tubing convolution.

The control shaft 15 is then moved to the left, as indicated in Fig. 12, releasing the compression upon the rubber members 73 and 71. These parts thereupon become relaxed or restored to normal position. The forming member 73 is withdrawn from the tubing convolution, and the gripping member 71 releases its hold upon the tubing. The outer corrugating member 13 then completes its movement to the left, as shown in Fig. 13, closing the space between it and the holding jaws 11 and 12, and completing the formation of the tubing convolution. Due to the fact that the convolution has been partially formed, it is gripped as the member 13 is moved to the left, causing the convolution to be thrust radially outwardly as it is axially compressed, into firm engagement with the annular shaping surfaces on the holding jaws 11 and 12 and on the forward end 68 of the corrugating member 13. During the forward movement of the outer corrugating member 13, the inner corrugating assembly 14 and the control shaft 15 are preferably also further moved forward, as illustrated in Fig. 13, so as to prevent any frictional drag between the tube and the sleeve 57 as the tube is fed forwardly or to the left. During this movement the rubber sleeves 73 and 71 remain relaxed or uncompressed.

While the member 13 remains in position to firmly grip and hold the newly formed convolution 81, the inner corrugating assembly 14 and the associated control shaft are then withdrawn to the position illustrated in Fig. 14, the rubber members 71 and 73 remaining relaxed or uncompressed during this movement. Any frictional drag between the sleeve 57 and the tube 60 cannot injure the newly formed tube convolution, due to the fact that the member 13 remains in convolution-holding position. The corrugating member 13 is then retracted as shown in Fig. 15, and thereafter the holding jaws 11 and 12 are separated. The control shaft 15 is then urged lightly against the forming assembly 14 causing the compression of the rubber sleeve 71 and the gripping of the tubing between the sleeves 71 and 69. Due to the fact that the rubber of sleeve 73 is harder than that of sleeve 71, the sleeve 73 is not materially expanded during this operation. The members 13 and 14 are then simultaneously moved forward or to the left, returning to their Fig. 9 position, and during this movement the tubing is fed forwardly removing the convolution 81 from the corrugating station. The control shaft moves forwardly with the member 14, but maintains the compression upon the rubber sleeve 71 to effect the tube-feeding operation. The parts are now restored to their Fig. 9 position and the cycle of operation is complete.

The described corrugating method and apparatus is particularly adapted for use in the corrugating of very thin-walled tubing, such for example as tubing of thin-walled stainless steel or the like, due to the fact that the tubing is worked both internally and externally during the corrugating operation. There is no tendency to collapse or crush the tubing wall such as results if the tubing wall is worked from one side only, for example externally. Also, due to the fact that the corrugating operation is effected at a single operating station corrugated tubing of any desired length, including very long lengths, may be made. In accordance with the structure of the invention the length of the tubing is limited only by the length of the sleeve 57, which may be made substantially as long as desired. It is to be noted, particularly with reference to Figs. 11, 12 and 13 that the tubing is positively gripped and fed forwardly both during the initial formation of the convolution, as shown in Fig. 11, and in the final formation of the convolution, as shown in Fig. 13. This insures that the metal of the tubing wall at the formed convolution is stressed only a minimum amount, thereby minimizing the working of the metal fibers, increasing the strength and life of the tubing. The operation is rapid and automatic. It is to be understood that if desired the control shaft 15 may be held stationary as the corrugating members move to their Fig. 13 position, thereby thrusting the rubber-forming member 73 completely into the finished tubing convolution, if desired. However it is preferred to only partially form the convolution by means of the rubber-forming member, as previously described, to minimize the working of the rubber.

In Fig. 6 a tubing piece such as may be made in accordance with the invention is illustrated. It is to be noted that the tubing may be provided with a non-corrugated cylindrical end section 84 by beginning the corrugating operation at a point spaced from the extreme tubing end. A cylindrical end section, such as the section 84, materially facilitates the attachment of the tubing to various types of coupling means, and is to be preferred to the irregular end section invariably resulting from tubing made by helically or spirally winding the tubing strip. Accordingly the invention provides for the making of corrugated tubing, which may be thin-walled, with a cylindrical end section to facilitate the attachment of coupling means.

Also by periodically interrupting the corrugating operation, and manually, partially withdrawing the tube from the machine, a tubing such as illustrated in Fig. 7 having spaced corrugated sections 85, 86 and 87 separated by non-corrugated sections 88 and 89 may be produced. Such tubing, having definite utility for certain types of installations is well adapted for production in accordance with the present invention due to the fact that the corrugating process takes place at a single operating station.

In Fig. 8, the manner in which the tubing wall is worked is illustrated. Due to the fact that the tubing corrugations are formed or thrust radially outwardly from the original tube diameter, the crest portions of the convolutions as indicated at 90 will be worked the greatest amount and will be thinner than the convolution trough portions 91. Accordingly in accordance with the invention the trough portions of the convolutions which are subjected to the major stress in the operation or use of the tubing are worked a minimum amount during the corrugating process. It is to be understood that Fig. 8 is merely illustrative and is drawn to an exaggerated scale.

While the methods and apparatus heretofore described may be used to produce satisfactory flexible bellows type tubing, in some instances where extremely deep corrugations to provide maximum bellows action are desired, it may be desirable to use additional corrugation working means as illustrated in Figs. 16, 17 and 18. In this instance the main machine head frame 10 is provided with an auxiliary frame 95, and a sleeve extension 96 at the upper end thereof. The sleeve 96 carries a rotatable working head generally indicated by the reference numeral 97. This working head is rotatably mounted upon the sleeve 96 and is adapted to be driven by means of a belt 98 and a pulley 99 secured to and rotatable with the gear 38. As best seen in Fig. 17, the rotary working head carries a series of rotatable corrugation working or forming rollers 100, each roller being mounted for reciprocation in a radial direction upon a reciprocable sub-frame 101. Springs 102 normally urge the working rollers radially outwardly out of contact with the tubing, and each sub-frame is provided at its outer end with a conical roller 103 by means of which the sub-frames may be moved inwardly against the action of the springs.

The rollers 103 are adapted to be engaged by a cone-operating member 104, Fig. 16, longitudinally reciprocable within a bearing 105 formed at the upper end of the auxiliary frame, under the control of a yoke lever 106 pivotally mounted as indicated at 107, and adapted to be operated by a cam 108 which engages a roller 109 carried on the lever. The cam 108 may be operated by means of suitable bevel gearing and a shaft 110 secured to and rotatable with the gear 37. The cone-operating member 104 is provided with a conical surface shaped to conform to the conical tapering of the rollers 103 so that as the operating member is moved to the right, as seen in Fig. 16, the cone rollers 103 will be engaged to thrust the sub-frames 101 and the working rollers 100 into engagement with the tubing.

In operation, the working head 97 is continuously rotated by means of the pulley 99, thereby causing the working rollers 100 and their associated frames to be rotated bodily around the axis of the tubing 60. As the cone-operating member 104 is moved to the right, as seen in Fig. 16, by the cam 108, the rollers 103 are engaged and thrust inwardly, moving the rollers 100 into working engagement with the tubing convolutions against the action of springs 102. A spring 111 holds the roller 109 in engagement with the cam 108, and restores the cone-operating member to normal inoperative position. The contour and timing of the cam 108 is such that the working rollers 100 will be thrust inwardly into engagement with the tubing when the tubing is axially stationary. It is to be understood that the rollers engage the tubing as the tubing emerges from the primary corrugating mechanism previously described with reference to Figs. 1 to 15, inclusive, to effect a finishing operation. When the operation of the rollers 100 is not desired, the cam 108 may be disabled by suitable clutch mechanism, not shown.

The detail of one suitable form of working roller is shown in Fig. 18. In this particular instance the tubing, as it emerges from the primary corrugating station, is provided with convolution crest portions 115 which are wider than the trough portions 116. The working roller is adapted to increase the depth of the corrugations as well as to narrow the crest portions thereof. To this end the working roller is provided with a series of flange portions 117, the pitch of which progressively decreases and the height of which progressively increases from one end of the roller to the other. Also the barrel diameter of the roller between the flanges constantly decreases as indicated at 118. Accordingly as the roller reciprocates and successively engages and works the tubing convolutions the crest portions will be reduced in width as indicated at 115a to a width equal to the troughs, the crests 115a will be moved radially outwardly and the troughs 116a will be moved radially inwardly from the original tube diameter indicated by the line A—B. The depth of the tubing convolution may be substantially doubled from its original depth, approximately seventy-five per cent of the finished tubing convolution being radially outwardly from the original tube diameter, and twenty-five per cent of the finished convolution being disposed radially inwardly from the original diameter, whereas the originally formed convolutions were entirely outwardly from the original tube diameter. A flexible tubing of increased flexibility and suitable for the most exacting bellows requirements is thereby produced. It is to be understood that the rollers 100 may be of various desired shapes whereby to impart the desired reshaping to the tubing convolutions.

It is obvious that various changes may be made in the specific apparatus embodiments and method steps heretofore shown and described without departing from the spirit of the invention. Accordingly the invention is not to be limited to the precise embodiments and methods described, but only as indicated in the following claims.

The invention is hereby claimed as follows:

1. An apparatus for making flexible corrugated metal tubing comprising means for supporting a piece of tubing to be corrugated, a member of flexible plastic material engageable against a substantially annular wall section of the tubing at a corrugating station, means for axially compressing said member to radially project said member against the tubing wall whereby to produce an annular corrugation therein, means engageable with the tubing on opposite sides of said member for positively feeding tubing wall sections on either side of the radially displaced section axially toward each other, and means for simultaneously operating said axial compressing means and said positive feeding means.

2. An apparatus for making flexible corrugated metal tubing comprising means for supporting a piece of tubing to be corrugated, a member of flexible plastic material engageable against a substantially annular wall section of the tubing at a corrugating station, means for axially compressing said member to radially project said member against the tubing wall whereby to produce an annular corrugation therein, means engageable with the tubing on opposite sides of said member for positively feeding tubing wall sections on either side of the radially displaced section axially toward each other, and means for simultaneously operating said axial compressing means and said positive feeding means, means for shifting the tubing axially a predetermined distance to bring a new tubing wall portion to the corrugating station, and means for successively operating said axial compressing and positive feeding means and said shifting means whereby to progressively produce a series of corrugations along the length of the tubing.

3. An apparatus for making flexible corrugated metal tubing comprising means for supporting a piece of tubing to be corrugated, means operable at a corrugating station for simultaneously radially projecting all parts of a substantially annular tubing wall section to partially form a corrugation therein, means engageable with the tubing on opposite sides of the projected section for feeding the engaged tubing portions relatively toward each other to complete the formation of the tubing corrugation, and control means for operating said projecting means and said feeding means so that the effective operation of the feeding means follows the effective operation of the projecting means.

4. An apparatus as defined in claim 3, wherein said projecting means comprises a member of flexible plastic material engageable with and radially projectable against an annular tubing wall portion.

5. An apparatus as defined in claim 3, wherein said feeding means comprises a pair of die members engageable with opposite sides of the partially formed tubing corrugation and movable relatively toward each other to complete the formation of the corrugation.

6. An apparatus as defined in claim 3, wherein said projecting means comprises a member of flexible plastic material engageable with and radially projectable against an annular tubing wall section, and wherein said feeding means comprises a pair of die members engageable with opposite sides of the partially formed tubing corrugation and movable relatively toward each other to complete the formation of the corrugation.

7. An apparatus as defined in claim 3, wherein said projecting means comprises a member of flexible plastic material engageable with and radially projectable against an annular tubing wall portion, and wherein said feeding means comprises a pair of die members engageable with opposite sides of the partially formed tubing corrugation and movable relatively toward each other to complete the formation of the corrugation, one of said die members being a split die shaped to conform to the contour of the corrugated tubing.

8. An apparatus for making flexible corrugated metal tubing comprising means for supporting a piece of tubing to be corrugated, means operable at a corrugating station for simultaneously radially projecting all parts of a substantially annular tubing wall section to partially form a corrugation therein, means engageable with the tubing on opposite sides of the projected section for feeding the engaged tubing portions relatively toward each other to complete the formation of the tubing corrugation, means for shifting the tubing axially a predetermined distance to bring new tubing wall portions to the corrugating station, and means for operating said projecting means, said feeding means, and said shifting means so that the effective operation of the feeding means follows the effective operation of the projecting means and the corrugations are progressively formed along the length of the tubing.

9. An apparatus for making flexible corrugated metal tubing comprising means for supporting a piece of tubing to be corrugated, means operable at a corrugating station for simultaneously radially projecting all parts of a substantially annular tubing wall section to partially form a corrugation therein, means engageable with the tubing for completing the formation of the partially formed corrugation, means for shifting the tubing axially a predetermined distance to bring new tubing wall portions to the corrugating station, and means for operating said projecting means, said completing means, and said shifting means so that the effective operation of the completing means follows the effective operation of the projecting means and the corrugations are progressively formed along the length of the tubing.

10. An apparatus as defined in claim 9, wherein said projecting means comprises a member of flexible plastic material engageable with and projectable against an annular tubing wall portion.

11. An apparatus for making corrugated metal tubing comprising means for supporting a piece of tubing to be corrugated, means comprising a member of flexible plastic material radially projectable at a corrugating station against a substantially annular tubing wall section to partially form a corrugation therein, means for projecting said member, means comprising a pair of dies engageable against the sides of the partially formed corrugation and movable relatively toward each other to complete the formation of the corrugation, means for moving said dies, and means for controlling the operation of said member projecting means and said die moving means so that the effective operation of the dies follows the effective operation of said projectable member.

12. An apparatus for making corrugated metal tubing comprising means for supporting a piece of tubing to be corrugated, means comprising a member of flexible plastic material radially projectable at a corrugating station against a substantially annular tubing wall section to partially form a corrugation therein, means for projecting said member, means comprising a pair of dies engageable against the sides of the partially formed corrugation and movable relatively toward each other to complete the formation of the corrugation, means for moving said dies, means for shifting the tubing axially a predetermined distance to bring new tubing wall portions to the corrugating station, and means for controlling the operation of said member projecting means, said die moving means and said shifting means so that the corrugations are progressively formed along the length of the tubing.

13. An apparatus as defined in claim 11, wherein one of said dies is a split die shaped to conform to the contour of the corrugated tubing.

DAVID WENDELL FENTRESS.